US010956059B2

(12) United States Patent
Thakkar et al.

(10) Patent No.: US 10,956,059 B2
(45) Date of Patent: Mar. 23, 2021

(54) CLASSIFICATION OF STORAGE SYSTEMS AND USERS THEREOF USING MACHINE LEARNING TECHNIQUES

(71) Applicant: EMC IP Holding Company LLC, Hopkington, MA (US)

(72) Inventors: Bina K. Thakkar, Cary, NC (US); Roopa A. Luktuke, Morrisville, NC (US); Aditya Krishnan, Cary, NC (US); Chao Su, Cary, NC (US); Deepak Gowda, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 33 days.

(21) Appl. No.: 16/527,269

(22) Filed: Jul. 31, 2019

(65) Prior Publication Data

US 2021/0034259 A1 Feb. 4, 2021

(51) Int. Cl.
*G06F 3/06* (2006.01)
*G06N 20/00* (2019.01)
*G06K 9/62* (2006.01)

(52) U.S. Cl.
CPC .......... *G06F 3/0629* (2013.01); *G06F 3/0683* (2013.01); *G06K 9/6223* (2013.01); *G06K 9/6267* (2013.01); *G06N 20/00* (2019.01); *G06F 3/0604* (2013.01)

(58) Field of Classification Search
CPC .... G06F 3/0604; G06F 3/0629; G06F 3/0683; G06N 20/00; G06K 9/6267; G06K 9/6223
USPC ........................................................ 711/154
See application file for complete search history.

(56) References Cited

U.S. PATENT DOCUMENTS

| 9,043,279 | B1 | 5/2015 | Yucel et al. |
| 9,778,927 | B2* | 10/2017 | Uchiyama ................ G06F 8/65 |
| 10,073,858 | B2 | 9/2018 | Baranowsky |
| 10,348,562 | B2 | 7/2019 | Radhakrishnan et al. |
| 2009/0260053 | A1* | 10/2009 | Kolz .................. G06F 21/6218 726/1 |

(Continued)

OTHER PUBLICATIONS

Dell EMC, CloudIQ Detailed Review, White Paper, Oct. 2018.

(Continued)

*Primary Examiner* — Hashem Farrokh
(74) *Attorney, Agent, or Firm* — Ryan, Mason & Lewis, LLP (57) ABSTRACT

Methods, apparatus, and processor-readable storage media for classification of storage systems and users thereof using machine learning techniques are provided herein. An example computer-implemented method includes processing input data pertaining to multiple storage systems within an enterprise; classifying one or more of the storage systems by applying a first set of machine learning techniques to the processed input data; classifying one or more respective users of the classified storage systems by applying a second set of machine learning techniques to the processed input data associated with the classified storage systems; and outputting, via one or more user interfaces, at least a portion of the storage system classifications and at least a portion of the user classifications to a user for use in connection with storage system configuration actions and/or an entity within the enterprise for use in connection with user-support actions.

18 Claims, 8 Drawing Sheets

(56) References Cited

U.S. PATENT DOCUMENTS

| | | |
|---|---|---|
| 2016/0041788 A1 | 2/2016 | Lee et al. |
| 2018/0329935 A1* | 11/2018 | Mugali .................. G06N 20/00 |
| 2018/0349366 A1 | 12/2018 | Baranowsky |
| 2019/0073137 A1* | 3/2019 | Vansteenkiste ........ G06N 7/005 |
| 2019/0121889 A1* | 4/2019 | Gold ....................... G06F 3/061 |
| 2019/0188025 A1 | 6/2019 | Anderson et al. |
| 2020/0134083 A1* | 4/2020 | Elliman ................ G06F 3/0482 |

OTHER PUBLICATIONS

Wikipedia, Apriori algorithm, https://en.wikipedia.org/w/index.php?title=Apriori_algorithm&oldid=887901450, Mar. 15, 2019.

* cited by examiner

```
/**
 * Return the list of features (data set) for all supported systems
 */
SystemFeatureList getSystemFeatureList() {
    // Get the list of candidate systems monitored
    List systemsList = getSupportedSystems();
    List systemFeatureList = new List<SystemData>();
    for(System : systemsList) {
        //Get configuration data for systems like its storage objects, its Cache
        //policy, Storage tiering policy, Uptime, etc.
        systemData.addConfigData(DataStoreClient.getConfigData(system));
        //Get the health score associated with this system
        systemData.addHealthScore(DataStoreClient.getHealthScore(system));
        //Get the list of Service Requests(User Issues) associated with this
        //systems. Both active and resolved.
        systemData.addSRData(SRApiClient.getSRs(system));
        //Calculate the count of each type of storage resource object created in
        //the storage system.
        systemData.addStorageObjectCounts(DataStoreClient.getConfigData(system));
        //Calculate the count of critical Service request that have been opened
        // against this system.
        systemData.addCriticalSRCount(SRApiClient.getSRs(system));
        //Calculate the number of storage objects that have a critical health
        //issue.
        systemData.addStorageObjectsWithCriticalHealth(
                        healthEventClient.getCriticalStorageObjects (system));
        // update the feature list with the system data of every system
        systemFeatureList.add(systemData);
    }
    return systemFeatureList;
}
```

```
/**
 * System Clustering algorithm
 * Description: This method returns the rank of the system based on K-Means
 * clustering (where K = 3)
 * @Return - SystemRankMap -- SystemRank - for each
 * system in a map.
 */
SystemRankMap<System, SystemRank> runSystemClustering(SystemFeatureList
                                       systemFeatureList) {
    //Run Principal Component Analysis on the feature data set to transform the
    // data and get the PCA reduced data set.
    PCAReducedSystemFeatureList =
                        PCAFitAndTransform(systemFeatureList);
    //Convert the PCA reduced data set to n*m array
    PCADataSetArray[] pcaArray = pcaReducedSystemFeatureList.toArray();

// Shuffle classes and data
    pcaArray.shuffle();
    //Choose 20% of the records as training set
    TrainingData[] trainData = pcaArray[:pcaArray.length()/5];
    //Choose the remaining 80% of the records for test data
    TestData[] testData = pcaArray[pcaArray.length()/5:];
    //Initialize K-Mean run with K=3
    ClusterFit cf = KMeans(3);
    //Determine centroids for the cluster with training data
    cf.fit(trainData);
    //Run K-Means
    SystemRankMap systemRankKMap =
                        SystemRankMap <System, SystemRank>(cf.predict(testData);
    return systemRankMap;
}
```

```
/**
 * User Clustering algorithm
 * Description: This method returns the rating of the user based on K-Means
 * clustering (where K = 3)
 *
 * Takes the systems rankings and the system feature list of each user to
 * create the user rating clusters
 *
 * @Return - UsserRatingMap -- UserRating - for
 * each user in a map.
 */
UserRatingMap<User, UserRating> runUserClustering(SystemFeatureList, SystemRankMap
                                                  systemRankMap) {

//Convert the feature list of all systems into map of feature list grouped by each user.
    Map<User, UserFeatureList> userFeatureMap =
    groupSystemFeatureListbyUser(systemFeatureList);

//Run Principal Component Analysis on the feature data set to transform the
    // data and get the PCA reduced data set.
    PCAReducedUserFeatureList pcaReducedUserFeatureList =
                              PCAFitAndTransform(userFeatureMap);

//Convert the PCA reduced data set to n*m array
    PCADataSetArray[] pcaArray = pcaReducedUserFeatureList.toArray();

// Shuffle classes and data
    pcaArray.shuffle();
    //Choose 20% of the records as training set
    TrainingData[] trainData = pcaArray[:pcaArray.length()/5];
    //Choose the remaining 80% of the records for test data
    TestData[] testData = pcaArray[pcaArray.length()/5:];
    //Initalize K-Mean run with K=3
    ClusterFit cf = KMeans(3);
    //Determine centroids for the cluster with training data
    cf.fit(trainData);
    //Run K-Means
    UserRatingMap userRatingMap =
                  UserRatingMap<User, UserRating>(cf.predict(testData);

return userRatingMap;
}
```

CLASSIFICATION OF STORAGE SYSTEMS AND USERS THEREOF USING MACHINE LEARNING TECHNIQUES

CROSS-REFERENCE TO RELATED APPLICATIONS

The present application is related to U.S. patent application Ser. No. 16/527,253, entitled "Machine Learning-Based Recommendation Engine for Storage System Usage Within an Enterprise," filed concurrently herewith and incorporated by reference herein.

FIELD

The field relates generally to information processing systems, and more particularly to techniques for processing storage system data in such systems.

BACKGROUND

Enterprises and other organizations commonly include large numbers of storage systems and users associated therewith. Accordingly, enterprise databases related to the monitoring and analysis of such storage systems can include significant amounts of configuration and operations data. However, conventional storage system monitoring and analysis approaches face challenges in effectively comparing performance across different storage systems and storage system users.

SUMMARY

Illustrative embodiments of the disclosure provide techniques for classification of storage systems and users thereof using machine learning techniques. An exemplary computer-implemented method includes processing input data pertaining to multiple storage systems within an enterprise, and classifying one or more of the multiple storage systems by applying a first set of one or more machine learning techniques to the processed input data. Such a method also includes classifying one or more respective users of the one or more classified storage systems by applying a second set of one or more machine learning techniques to at least a portion of the processed input data associated with the one or more classified storage systems. Further, such a method includes outputting, via one or more user interfaces, at least a portion of the storage system classifications and at least a portion of the user classifications to one or more of a user for use in connection with one or more storage system configuration actions and an entity within the enterprise for use in connection with one or more user-support actions.

Illustrative embodiments can provide significant advantages relative to conventional storage system monitoring and analysis techniques. For example, challenges associated with effectively comparing performance across different storage systems and storage system users are overcome through machine learning-based techniques for classifying storage systems and users thereof across enterprise communities. In some embodiments, such techniques derive rich storage systems insights and enable the identification and sharing of best practices with respect to system configurations and operations.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
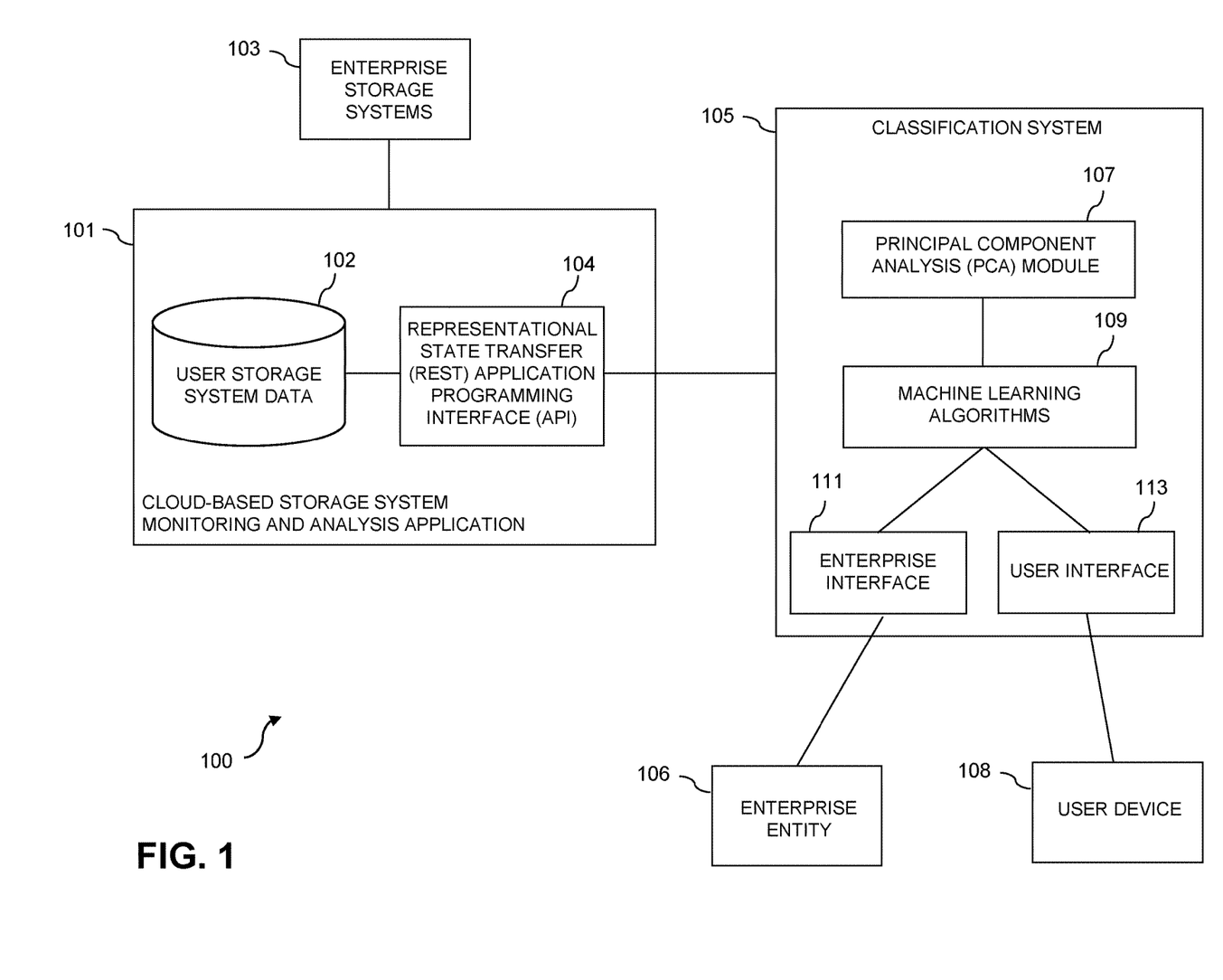
FIG. 1 shows an information processing system configured for classification of storage systems and users thereof using machine learning techniques in an illustrative embodiment.

FIG. 1 shows a computer network (also referred to herein as an information processing system) 100 configured in accordance with an illustrative embodiment. The computer network 100 comprises a cloud-based storage system monitoring and analysis application 101, which interacts with enterprise storage systems 103 and includes a user storage system data database 102 and a representational state transfer (REST) application programming interface (API) 104. Additionally, the computer network 100 also comprises a classification system 105, which includes a principal component analysis (PCA) component 107, machine learning algorithms 109, an enterprise interface 111 and a user interface 113. In at least one embodiment, the cloud-based storage system monitoring and analysis application 101 is coupled to the classification system 105 via a network, wherein the network in such an embodiment is assumed to represent a sub-network or other related portion of the larger computer network 100. As also depicted in FIG. 1, the computer network 100 comprises at least one enterprise entity 106 and at least one user device 108, which can be coupled to the classification system 105 as well.

It is to be appreciated that the term "user" in this context and elsewhere herein is intended to be broadly construed so as to encompass, for example, human, hardware, software or firmware entities, as well as various combinations of such entities. For example, a user may comprise, for example, mobile telephones, laptop computers, tablet computers, desktop computers or other types of computing devices. Such users in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Such a network is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, in one or more embodiments, each classification system 105 is assumed to be implemented using at least one processing device. Each such processing device generally comprises at least one processor and an associated memory, and implements one or more functional modules for controlling certain features of the classification system 105.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

It is to be appreciated that the particular arrangement of the PCA module 107, the machine learning algorithms 109, the enterprise interface 111 and the user interface 113 illustrated in the classification system 105 of the FIG. 1 embodiment is presented by way of example only, and alternative arrangements can be used in other embodiments. For example, the functionality associated with the modules 107, 109, 111 and 113 in other embodiments can be combined into a single module, or separated across a larger number of modules. As another example, multiple distinct processors can be used to implement different ones of the modules 107, 109, 111 and 113 or portions thereof.

It is to be understood that the particular set of elements shown in FIG. 1 for classifying storage systems and users thereof using machine learning techniques involving cloud-based storage system monitoring and analysis application 101 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 107, 109, 111 and 113 of example classification system 105 in computer network 100 will be described in more detail with reference to the flow diagram of FIG. 6.

Accordingly, at least one embodiment of the invention includes classification of storage systems and users thereof using machine learning techniques. Such an embodiment can include classifying storage systems and users thereof among an entire population of a given community to derive rich storage systems insights and to share the best practices of various system configurations and features to improve efficiency and reduce total cost of ownership.

Additionally, one or more embodiments include implementing an unsupervised k-means machine learning system rating algorithm to classify storage systems into predefined classification groups (e.g., platinum, gold and silver classifications). Further, such an embodiment also includes implementing an additional unsupervised k-means machine learning algorithm to classify users of such storage systems into predefined designations (e.g., one-star, two-star, and three-star ratings).

Input data utilized by one or more embodiments can include storage system configuration data, storage system operations data, heuristic-based health scores (attributed to storage systems and/or users), user service request count information, etc. Such input data can be, in at least one embodiment, processed via feature engineering techniques including cleaning of the data, imputing missing data, converting numerical data to categorical data, etc. Such feature engineering techniques can be performed, for example, on a given collection of historical input data (e.g., the last six months of data).

Also, in at least one embodiment PCA is performed to reduce dimensionality of the input data to two dimensions. Further, in one or more embodiments, k-means and/or density-based spatial clustering of applications with noise (DBSCAN) clustering algorithms are run on the featured dataset to classify each storage system (e.g., classify each storage system as platinum, gold or silver). The output of the storage system classifications is passed through additional k-means clustering to classify the users thereof (e.g., classify each user with a one-, two- or three-star rating).

As further detailed herein, the storage system and user classification information can be displayed via a user interface and/or an enterprise interface (as well as an entity-related portal). By applying one or more heuristic calculations, at least one embodiment can additionally include generating and providing information related to other storage systems and users via the user interface and/or enterprise interface.

Figure 2:
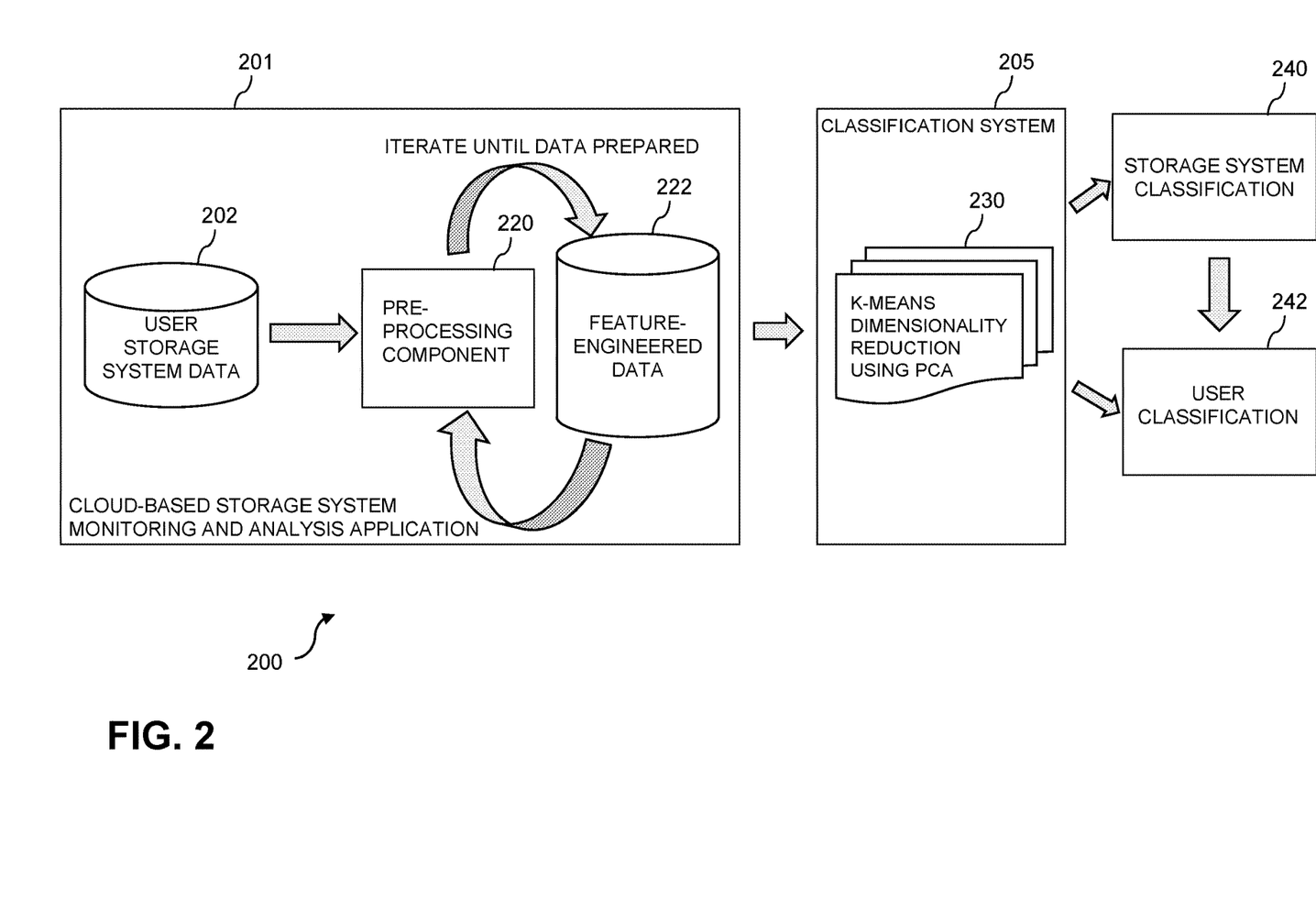
FIG. 2 shows an example workflow for classifying storage systems and users thereof using machine learning techniques in an illustrative embodiment.

FIG. 2 shows an example workflow for classifying storage systems and users thereof using machine learning techniques in an illustrative embodiment. By way of illustration, FIG. 2 depicts a computer network 200 configured in accordance with an illustrative embodiment. The computer network 200 comprises cloud-based storage system monitoring and analysis application 201, which includes user storage system data database 202, a pre-processing component 220 and a feature-engineered data database 222. As depicted, the pre-processing component 220 iterates over one or more portions of the data contained within database 202 until sufficient feature-engineered data is prepared.

Additionally, the computer network 200 also comprises classification system 205, which processes feature-engineered data provided by cloud-based storage system monitoring and analysis application 201 via k-means dimensionality reduction using PCA 230. Further, based at least in part on the module 230 processing, the classification system 205 generates and outputs a storage system classification 240 and a user classification 242 (which is generated based in part on the storage system classification 240). In one or more embodiments the storage system classification 240 provides a view (e.g., via at least one interface) to the user(s) and/or enterprise entity (e.g., support personnel) as to how effectively each of the storage systems has performed in relation to at least a portion of the rest of the storage systems of all other users in the enterprise. Also, in such an embodiment, the user classification 242 provides a means (e.g., via at least one interface) for a given user and/or enterprise entity (e.g., support personnel) to determine the given user's overall performance in relation to at least a portion of all other users within the enterprise.

Figure 3:
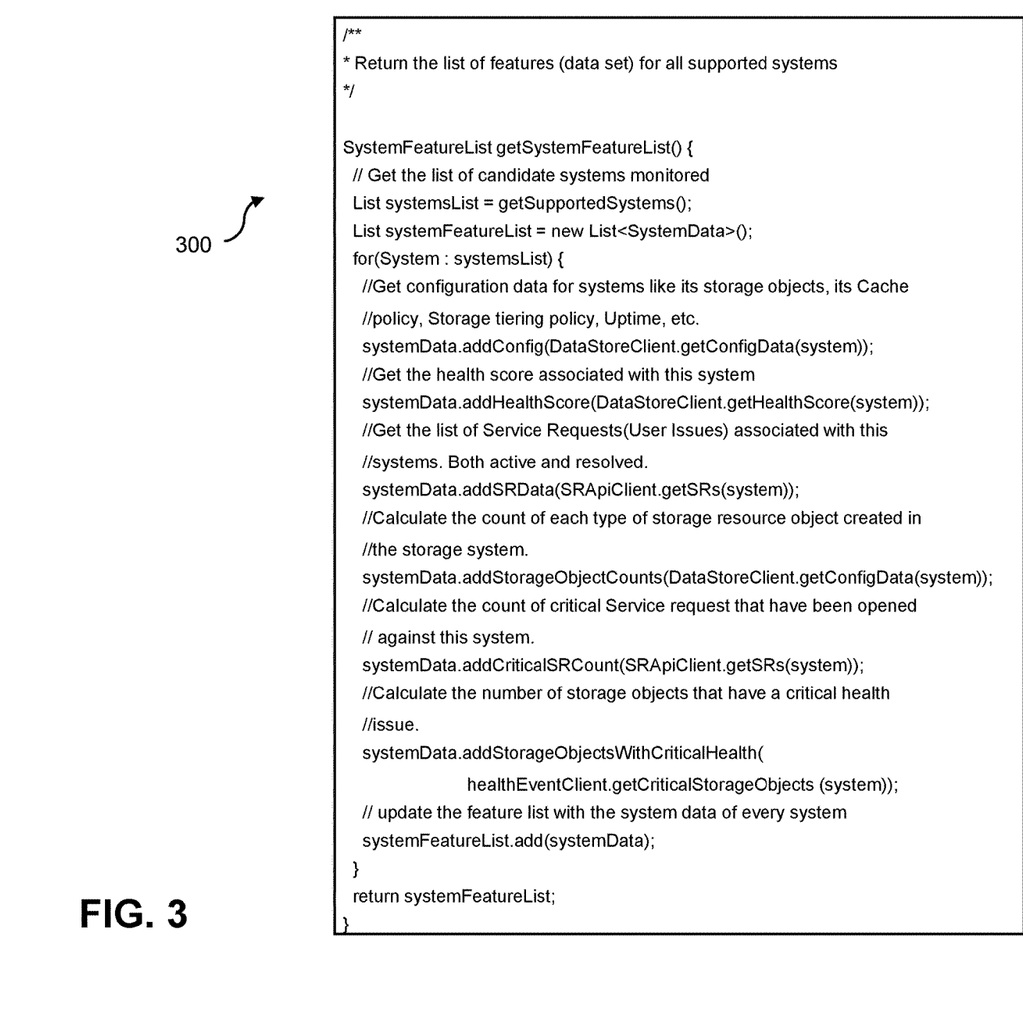
FIG. 3 shows example pseudocode for determining storage system features in an illustrative embodiment.

FIG. 3 shows example pseudocode for determining storage system features in an illustrative embodiment. In this embodiment, pseudocode 300 is executed by or under the control of a processing system, such as classification system 105, or another type of processing system. For example, the pseudocode 300 may be viewed as comprising a portion of a software implementation of at least part of PCA module 107 of the FIG. 1 embodiment.

The pseudocode 300 illustrates steps for extracting feature-engineered data by processing all of the storage system data in a relevant application (e.g., cloud-based storage system monitoring and analysis application 101 or 201).

It is to be appreciated that this particular pseudocode shows just one example implementation of a process for determining storage system features, and alternative implementations of the process can be used in other embodiments.

Figure 4:
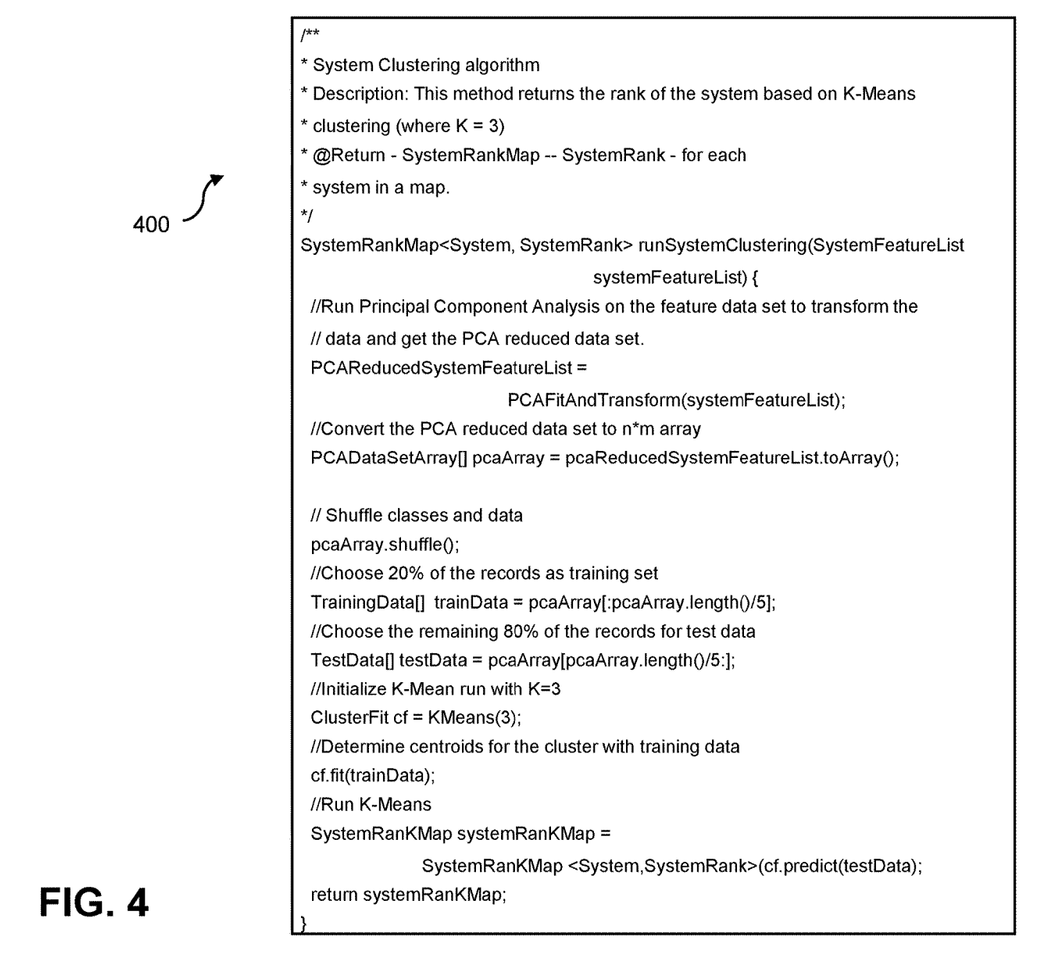
FIG. 4 shows example pseudocode for storage system clustering in an illustrative embodiment.

FIG. 4 shows example pseudocode for storage system clustering in an illustrative embodiment. In this embodiment, pseudocode 400 is executed by or under the control of a processing system, such as classification system 105, or another type of processing system. For example, the pseudocode 400 may be viewed as comprising a portion of a software implementation of at least part of machine learning algorithms 109 of the FIG. 1 embodiment.

The pseudocode 400 illustrates steps for ranking and/or classifying storage systems into three categories based on a k-means clustering algorithm. Pseudocode 400 further provides steps for refining a feature-engineered dataset by running PCA dimensionality reduction before inputting the dataset to the k-mean clustering algorithm.

It is to be appreciated that this particular pseudocode shows just one example implementation of a process for storage system clustering, and alternative implementations of the process can be used in other embodiments.

Figure 5:
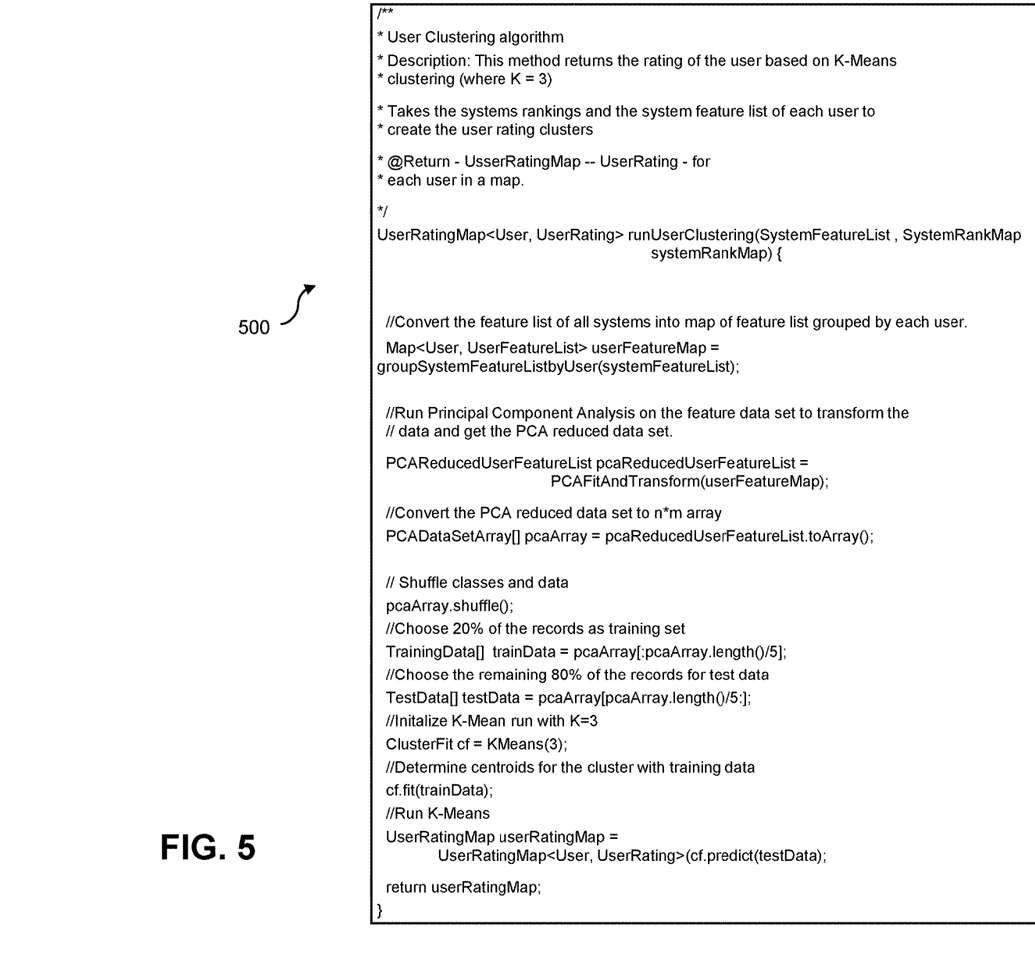
FIG. 5 shows example pseudocode for user clustering in an illustrative embodiment.

FIG. 5 shows example pseudocode for user clustering in an illustrative embodiment. In this embodiment, pseudocode 500 is executed by or under the control of a processing system, such as classification system 105, or another type of processing system. For example, the pseudocode 500 may be viewed as comprising a portion of a software implementation of at least part of machine learning algorithms 109 of the FIG. 1 embodiment.

The pseudocode 500 illustrates steps for ranking and/or classifying users into three categories based on a k-means clustering algorithm. Specifically, pseudocode 500 includes steps for providing the feature-engineered dataset and the classification information of the user's storage systems (obtained in connection with pseudocode 400, for example) to execute the user ranking k-mean clustering algorithm.

It is to be appreciated that this particular pseudocode shows just one example implementation of a process for user clustering, and alternative implementations of the process can be used in other embodiments.

Figure 6:
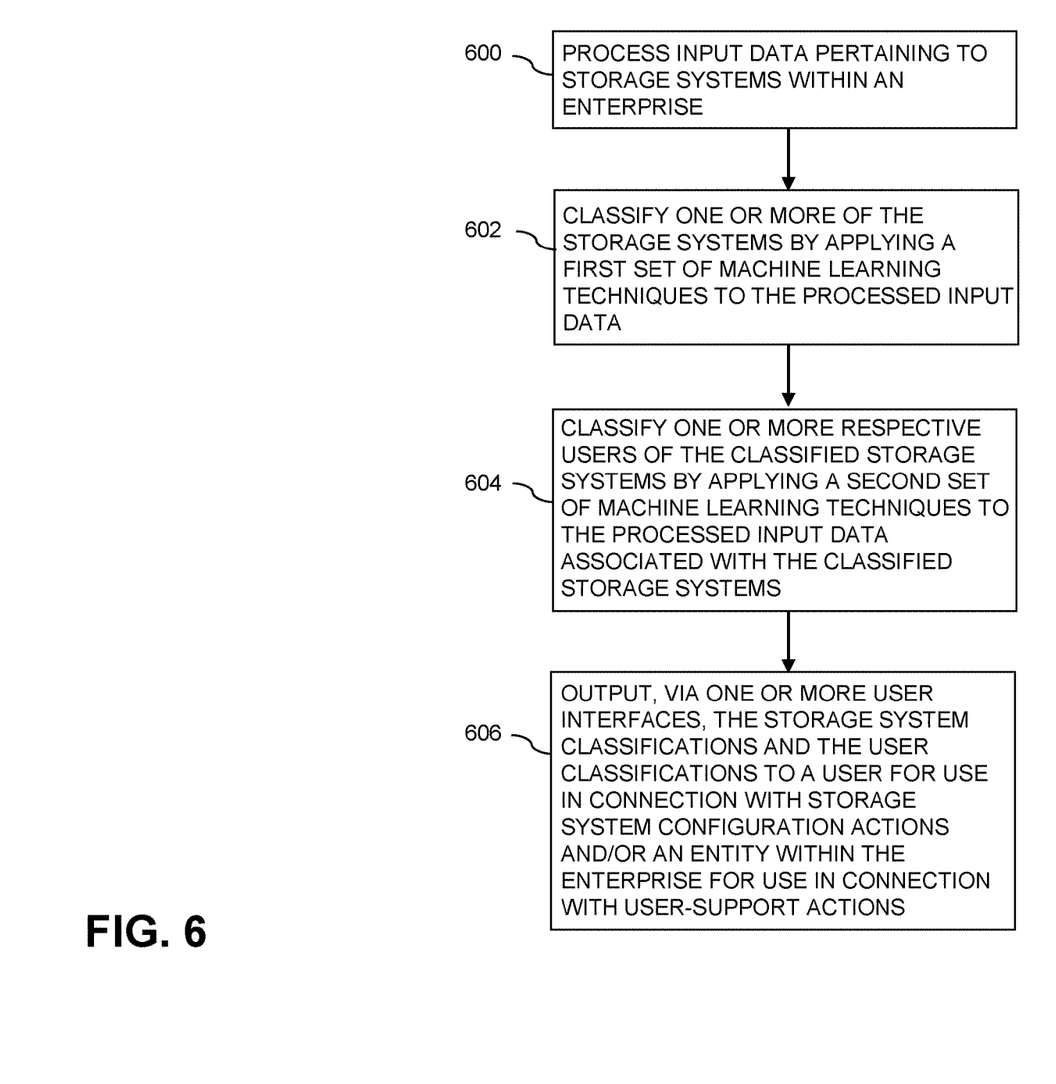
FIG. 6 is a flow diagram of a process for classification of storage systems and users thereof using machine learning techniques in an illustrative embodiment.

FIG. 6 is a flow diagram of a process for classification of storage systems and users thereof using machine learning techniques in an illustrative embodiment. It is to be understood that this particular process is only an example, and additional or alternative processes can be carried out in other embodiments.

In this embodiment, the process includes steps 600 through 606. These steps are assumed to be performed by the classification system 105 utilizing its modules 107, 109, 111 and/or 113.

Step 600 includes processing input data pertaining to multiple storage systems within an enterprise. In one or more embodiments, the input data includes storage system configuration data associated with the multiple storage systems, storage system operations data associated with the multiple storage systems, storage system heuristic-based health scores associated with the multiple storage systems, and/or user service request counts associated with the multiple storage systems. Processing the input data can include performing multiple feature engineering steps on the input data. Such feature engineering steps can include cleaning the input data, imputing one or more items of missing data in the input data, and converting, in the input data, one or more items of numerical data to one or more items of categorical data. Processing the input data can also include processing a portion of the input data encompassing a given temporal period.

Step 602 includes classifying one or more of the multiple storage systems by applying a first set of one or more machine learning techniques to the processed input data. In at least one embodiment, the first set of one or more machine learning techniques includes at least one unsupervised k-means machine learning clustering algorithm that analyzes at least a portion of the processed input data against a feature dataset, and ranks the multiple storage systems based at least in part of the analysis. Also, classifying the one or more storage systems can include classifying the one or more storage systems into one of multiple predetermined storage system classification groups.

Step 604 includes classifying one or more respective users of the one or more classified storage systems by applying a second set of one or more machine learning techniques to at least a portion of the processed input data associated with the one or more classified storage systems. In at least one embodiment, the second set of one or more machine learning techniques includes at least one unsupervised k-means machine learning clustering algorithm that processes at least a portion of the processed input data against the ranking of the multiple storage systems and the feature dataset, and generates a rating for each of the users based at least in part of the processing. Also, classifying the one or more respective users can include classifying the one or more respective users into one of multiple predetermined user classification groups.

Step 606 includes outputting, via one or more user interfaces, at least a portion of the storage system classifications and at least a portion of the user classifications to one or more of a user for use in connection with one or more storage system configuration actions and an entity within the enterprise for use in connection with one or more user-support actions. Outputting the at least a portion of the storage system classifications can include generating, via the one or more user interfaces, a view representing one or more performance levels for a given one of the storage systems relative to all of the storage systems within the enterprise. Additionally, outputting the at least a portion of the user classifications can include generating, via the one or more user interfaces, a view representing one or more performance levels for a given one of the users relative to all of the users within the enterprise.

The techniques depicted in FIG. 6 can also include automatically configuring one or more of the storage systems by executing the one or more storage system configuration actions, and automatically performing the one or more user-support actions by updating a data structure associated with at least one user. Also, at least one embodiment includes generating a comparison between at least one of the classified users and one or more additional classified users by applying one or more heuristic calculations to at least a portion of the processed input data associated with the classified users, and presenting, via at least one of the one or more user interfaces, the comparison to the at least one classified user.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement machine learning-based techniques for classifying storage systems and users thereof across enterprise communities. These and other embodiments can effectively provide storage systems insights and enable the identification and sharing of best practices with respect to system configurations and operations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
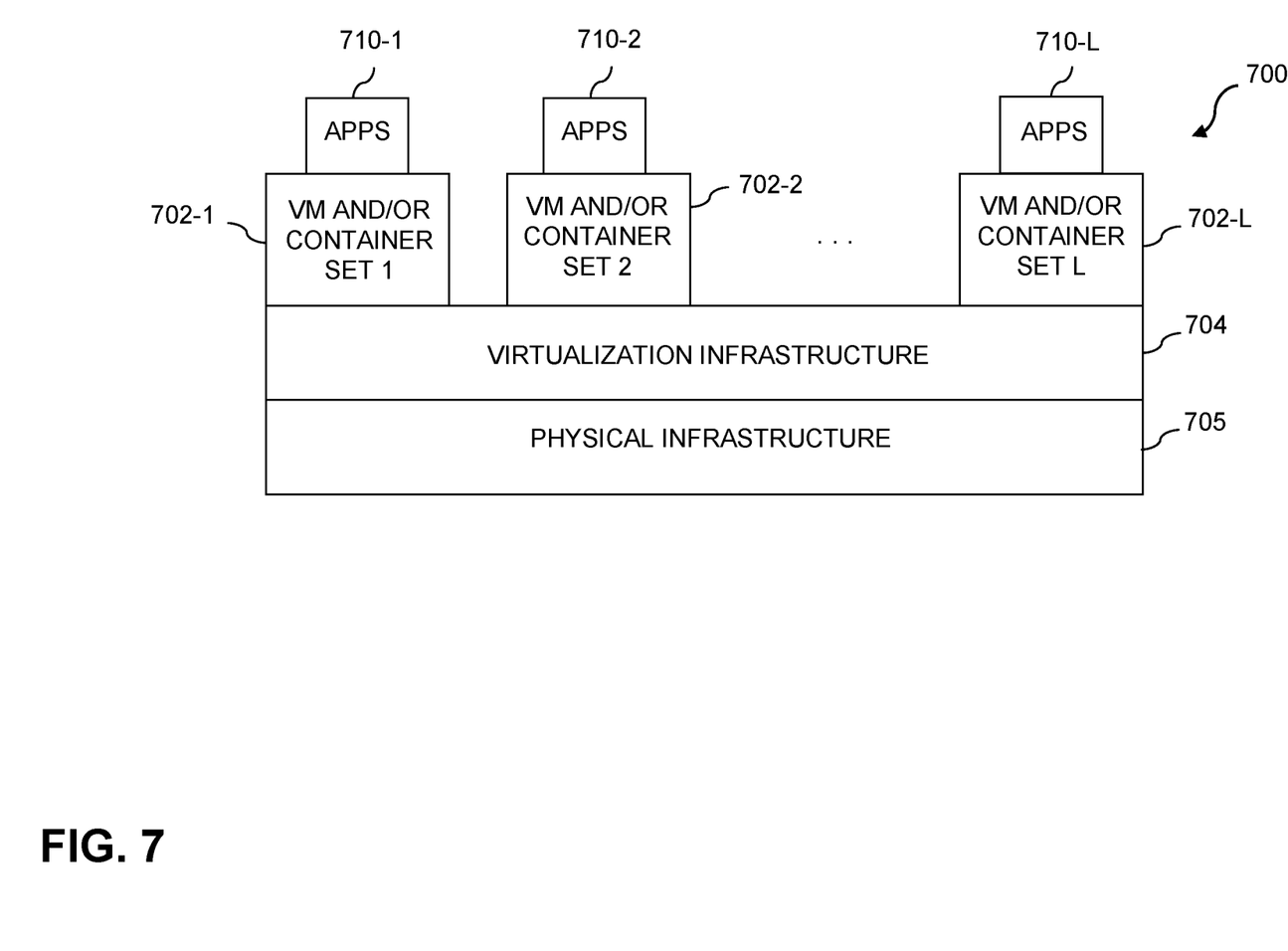
FIGS. 7 and 8 show examples of processing platforms that may be utilized to implement at least a portion of an information processing system in illustrative embodiments.
Figure 8:
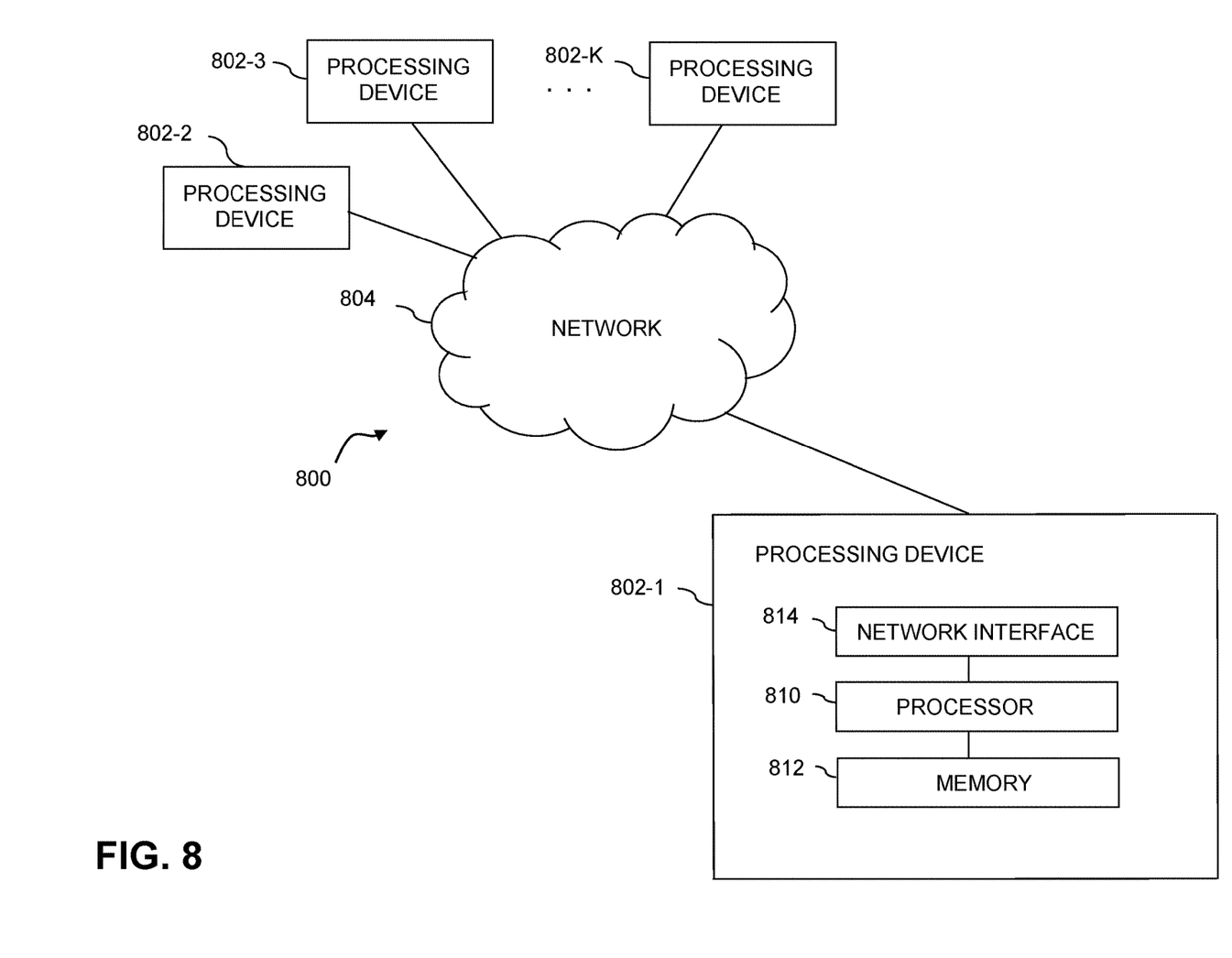

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

An example of a hypervisor platform used to implement a hypervisor within the virtualization infrastructure 704 is the VMware® vSphere® which has an associated virtual infrastructure management system such as the VMware® vCenter™. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing input data pertaining to multiple storage systems within an enterprise, wherein processing the input data comprises performing multiple feature engineering steps on the input data, and wherein performing the multiple feature engineering steps comprises cleaning the input data, imputing one or more items of missing data in the input data, and converting, in the input data, one or more items of numerical data to one or more items of categorical data;
classifying one or more of the multiple storage systems by applying a first set of one or more machine learning techniques to the processed input data;
classifying one or more respective users of the one or more classified storage systems by applying a second set of one or more machine learning techniques to at least a portion of the processed input data associated with the one or more classified storage systems; and
outputting, via one or more user interfaces, at least a portion of the storage system classifications and at least a portion of the user classifications to one or more of a user for use in connection with one or more storage system configuration actions and an entity within the enterprise for use in connection with one or more user-support actions;

wherein the method is performed by at least one processing device comprising a processor coupled to a memory.

2. The computer-implemented method of claim 1, wherein the first set of one or more machine learning techniques comprises at least one unsupervised k-means machine learning clustering algorithm that analyzes at least a portion of the processed input data against a feature dataset, and ranks the multiple storage systems based at least in part of the analysis.

3. The computer-implemented method of claim 2, wherein the second set of one or more machine learning techniques comprises at least one unsupervised k-means machine learning clustering algorithm that processes at least a portion of the processed input data against the raking of the multiple storage systems and the feature dataset, and generates a rating for each of the users based at least in part of the processing.

4. The computer-implemented method of claim 1, wherein processing the input data comprises processing a portion of the input data encompassing a given temporal period.

5. The computer-implemented method of claim 1, wherein classifying the one or more storage systems comprises classifying the one or more storage systems into one of multiple predetermined storage system classification groups.

6. The computer-implemented method of claim 1, wherein classifying the one or more respective users comprises classifying the one or more respective users into one of multiple predetermined user classification groups.

7. The computer-implemented method of claim 1, wherein the input data comprise one or more of storage system configuration data associated with the multiple storage systems, storage system operations data associated with the multiple storage systems, storage system heuristic-based health scores associated with the multiple storage systems, and user service request counts associated with the multiple storage systems.

8. The computer-implemented method of claim 1, further comprising:
automatically configuring one or more of the storage systems by executing the one or more storage system configuration actions.

9. The computer-implemented method of claim 1, further comprising:
automatically performing the one or more user-support actions by updating a data structure associated with at least one user.

10. The computer-implemented method of claim 1, wherein outputting the at least a portion of the storage system classifications comprises generating, via the one or more user interfaces, a view representing one or more performance levels for a given one of the storage systems relative to all of the storage systems within the enterprise.

11. The computer-implemented method of claim 1, wherein outputting the at least a portion of the user classifications comprises generating, via the one or more user interfaces, a view representing one or more performance levels for a given one of the users relative to all of the users within the enterprise.

12. The computer-implemented method of claim 1, further comprising:

generating a comparison between at least one of the classified users and one or more additional classified users by applying one or more heuristic calculations to at least a portion of the processed input data associated with the classified users; and presenting, via at least one of the one or more user interfaces, the comparison to the at least one classified user.

13. A non-transitory processor-readable storage medium having stored therein program code of one or more software programs, wherein the program code when executed by at least one processing device causes the at least one processing device:

to process input data pertaining to multiple storage systems within an enterprise, wherein processing the input data comprises performing multiple feature engineering steps on the input data, and wherein performing the multiple feature engineering steps comprises cleaning the input data, imputing one or more items of missing data in the input data, and converting, in the input data, one or more items of numerical data to one or more items of categorical data;

to classify one or more of the multiple storage systems by applying a first set of one or more machine learning techniques to the processed input data;

to classify one or more respective users of the one or more classified storage systems by applying a second set of one or more machine learning techniques to at least a portion of the processed input data associated with the one or more classified storage systems; and to output, via one or more user interfaces, at least a portion of the storage system classifications and at least a portion of the user classifications to one or more of a user for use in connection with one or more storage system configuration actions and an entity within the enterprise for use in connection with one or more user-support actions.

14. The non-transitory processor-readable storage medium of claim 13, wherein the program code further causes the at least one processing device:
to automatically configure one or more of the storage systems by executing the one or more storage system configuration actions.

15. The non-transitory processor-readable storage medium of claim 13, wherein the program code further causes the at least one processing device:
to automatically perform the one or more user-support actions by updating a data structure associated with at least one user.

16. An apparatus comprising:
at least one processing device comprising a processor coupled to a memory;
the at least one processing device being configured:
to process input data pertaining to multiple storage systems within an enterprise, wherein processing the input data comprises performing multiple feature engineering steps on the input data, and wherein performing the multiple feature engineering steps comprises cleaning the input data, imputing one or more items of missing data in the input data, and converting, in the input data, one or more items of numerical data to one or more items of categorical data;
to classify one or more of the multiple storage systems by applying a first set of one or more machine learning techniques to the processed input data;

to classify one or more respective users of the one or more classified storage systems by applying a second set of one or more machine learning techniques to at least a portion of the processed input data associated with the one or more classified storage systems; and to output, via one or more user interfaces, at least a portion of the storage system classifications and at least a portion of the user classifications to one or more of a user for use in connection with one or more storage system configuration actions and an entity within the enterprise for use in connection with one or more user-support actions.

17. The apparatus of claim 16, wherein the at least one processing device is further configured:

to automatically configure one or more of the storage systems by executing the one or more storage system configuration actions.

18. The apparatus of claim 16, wherein the at least one processing device is further configured:

to automatically perform the one or more user-support actions by updating a data structure associated with at least one user.

* * * * *